(12) United States Patent
Geiger et al.

(10) Patent No.: US 11,991,592 B2
(45) Date of Patent: May 21, 2024

(54) CONFIGURING A WIRELESS MESH NETWORK FOR LOCATIONING

(71) Applicant: ZEBRA TECHNOLOGIES CORPORATION, Lincolnshire, IL (US)

(72) Inventors: Edward W. Geiger, San Martin, CA (US); Janakiraman Gopalan, Cupertino, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/397,032

(22) Filed: Aug. 9, 2021

(65) Prior Publication Data

US 2021/0368301 A1 Nov. 25, 2021

Related U.S. Application Data

(63) Continuation of application No. 16/720,573, filed on Dec. 19, 2019, now Pat. No. 11,115,782.

(51) Int. Cl.
*H04W 4/029* (2018.01)
*H04W 84/18* (2009.01)

(52) U.S. Cl.
CPC ............ *H04W 4/029* (2018.02); *H04W 84/18* (2013.01)

(58) Field of Classification Search
CPC .............................. H04W 4/029; H04W 84/18
See application file for complete search history.

(56) References Cited

U.S. PATENT DOCUMENTS

| | | | | |
|---|---|---|---|---|
| 2005/0049780 A1* | 3/2005 | Friedrichs | .......... | G01C 21/3632 340/995.23 |
| 2015/0358234 A1* | 12/2015 | Krieger | .................. | H04L 47/19 709/235 |
| 2016/0127875 A1* | 5/2016 | Zampini | ............... | G01S 5/0226 370/311 |
| 2017/0019828 A1* | 1/2017 | Purohit | ................. | H04W 24/06 |
| 2017/0214604 A1* | 7/2017 | Qiao | ....................... | H04L 45/12 |
| 2017/0254664 A1* | 9/2017 | Parekh | ................. | G08G 5/0021 |
| 2018/0240339 A1* | 8/2018 | Moisio | ................. | H04W 12/10 |
| 2019/0383634 A1* | 12/2019 | Grani | ................. | G01C 21/3629 |
| 2020/0084571 A1* | 3/2020 | Krzych | ................. | G01S 5/0226 |
| 2020/0177545 A1* | 6/2020 | Shih | .................... | H04L 63/0263 |

OTHER PUBLICATIONS

International Search Report and Written Opinion for International Application No. PCT/US2020/052525 mailed on Nov. 19, 2020.

* cited by examiner

*Primary Examiner* — Barry W Taylor

(57) ABSTRACT

A locationing platform may receive, via a mesh network, a locationing communication associated with a waypoint beacon. The locationing platform may identify an entry node of the locationing communication. The locationing platform may determine a waypoint location associated with the waypoint beacon based on locationing information in the locationing communication. The locationing platform may determine a node location of the entry node based on the waypoint location. The locationing platform may configure, based on the node location, a relay node of the mesh network to forward or drop subsequently received locationing communications that are associated with the waypoint beacon.

8 Claims, 11 Drawing Sheets

200

230
Relay node(s) maintain node mapping to determine node policy

Node Mapping

| Node ID | Near Waypoints | Topology Information |
|---------|----------------|----------------------|
| N1 | WP1 | N2, N3(GW) |
| N2 | --- | N1, N3(GW), N4 |
| N3 | --- | N1, N2, N5, N7 |
| N4 | --- | N2, N5, N6 |
| N5 | --- | N2, N3(GW), N4, N6, N7 |
| N6 | WP2 | N4, N5, N8 |
| N7 | --- | N3(GW), N5, N8 |
| N8 | WP3 | N6, N7 |

N2

240
N2 determines whether to forward locationing communication using node mapping and identification of WP1

CONFIGURING A WIRELESS MESH NETWORK FOR LOCATIONING

RELATED APPLICATION

This patent arises from a continuation of U.S. patent application Ser. No. 16/720,573, filed Dec. 19, 2019, which is hereby incorporated herein by reference.

FIELD OF THE DISCLOSURE

This disclosure relates generally to a wireless mesh network and, for example, to configuring a wireless mesh network for locationing.

BACKGROUND

Short range wireless communication enables wireless communication over relatively short distances (e.g., within 30 meters). For example, BLUETOOTH® is a wireless technology standard for exchanging data over short distances using short-wavelength ultra high frequency (UHF) radio waves from 2.4 gigahertz (GHz) to 2.485 GHz. BLUETOOTH® Low Energy (BLE) is a form of BLUETOOTH® communication that allows for communication with devices running on low power. Such devices may include beacons, which are wireless communication devices that may use low-energy communication technology for locationing, proximity marketing, and/or the like. Furthermore, such devices may serve as nodes (e.g., relay nodes) of a wireless mesh network that communicates and/or relays information to a managing platform or hub associated with the wireless mesh network.

DETAILED DESCRIPTION

Figure 1A:
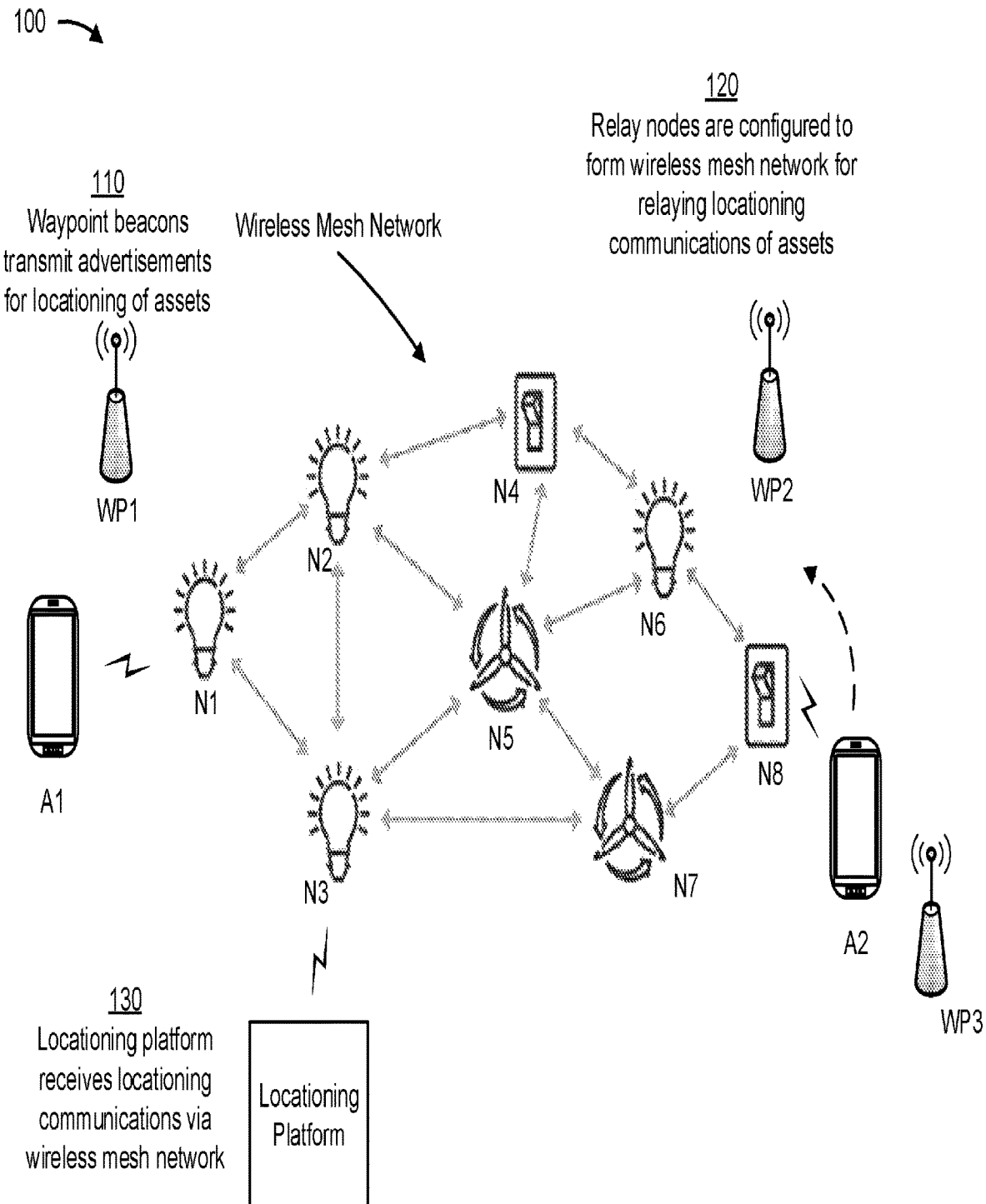
FIGS. 1A-1C and 2A-2C are diagrams of one or more example implementations described herein.

The following detailed description of example implementations refers to the accompanying drawings. The same reference numbers in different drawings may identify the same or similar elements.

In some instances, a wireless mesh network may be formed from a plurality of short range wireless communication devices (e.g., BLUETOOTH® devices, BLUETOOTH® Low Energy (BLE) devices, and/or the like), which may be referred to herein as "relay nodes." In such cases, the wireless mesh network is formed from each of the relay nodes being configured to forward received communications to other relay nodes that are within range of the receiving relay node. Therefore, the topology of the wireless mesh network may be defined by communication ranges of the relay nodes. As a result, a particular communication that includes information of interest (e.g., locationing information) may enter the wireless mesh network based on a location of a device (e.g., an asset beacon) that transmitted the communication and a nearest relay node to the device.

Furthermore, according to previous techniques, the information is then forwarded to the remaining relay nodes of the wireless mesh network, according to the topology of the wireless mesh network, so that the information reaches an ultimate destination. For example, locationing information may be received from an asset beacon by one of the relay nodes, forwarded through the wireless mesh network to the other remaining relay nodes of the wireless network, and ultimately received by a locationing platform that is communicatively coupled with one or more of the relay nodes of the mesh network.

However, forwarding the locationing information through the mesh network in such a manner wastes communication resources of the wireless mesh network, wastes processing resources of the relay nodes, and/or causes corresponding delays in communicating the information. More specifically, a relay node that is not positioned (e.g., physically or topologically) between an entry node of the wireless mesh network for a communication and an ultimate destination of the communication wastes resources processing and/or forwarding the communication because the communication could have reached the ultimate destination through other nodes of the wireless mesh network more quickly and/or using less resources. Accordingly, that relay node is consuming resources and/or bandwidth of the wireless mesh network unnecessarily.

According to some implementations described herein, a locationing platform and/or relay node is to configure a wireless mesh network for locationing. In some implementations, the locationing platform may receive a locationing communication associated with a waypoint beacon, identify an entry node of the locationing communication, determine a node location of the entry node based on a location of the waypoint beacon, and configure a relay node of the wireless mesh network based on the node location. Additionally, or alternatively, a relay node may receive a locationing communication associated with a waypoint beacon, determine a distance between a location of a waypoint beacon and a relay node location of the relay node and forward (e.g., to enable locationing to be performed using the locationing communication) or drop (e.g., to reduce resource consumption of the relay node and/or the wireless mesh network) the locationing communication based on the distance. In this way, the locationing platform and/or the relay node may reduce resource consumption of the relay node and/or bandwidth of the wireless mesh network by enabling locationing communications to be dropped by the relay node when the relay node is not along an optimal route path of the wireless mesh network (e.g., not positioned between an entry node and the locationing platform). Furthermore, freeing up the wasted resources and/or bandwidth allows for an increased number of locationing communications to be received by the relay nodes and/or communicated through the wireless mesh network to allow for locationing of an increased number of asset beacons within a same time period of previous techniques.

Figure 1B:
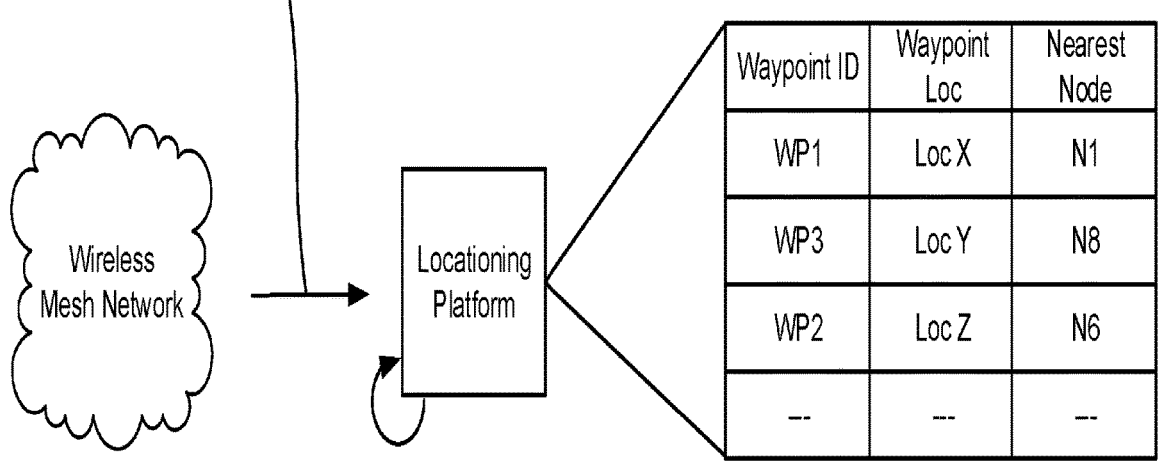
Figure 1C:
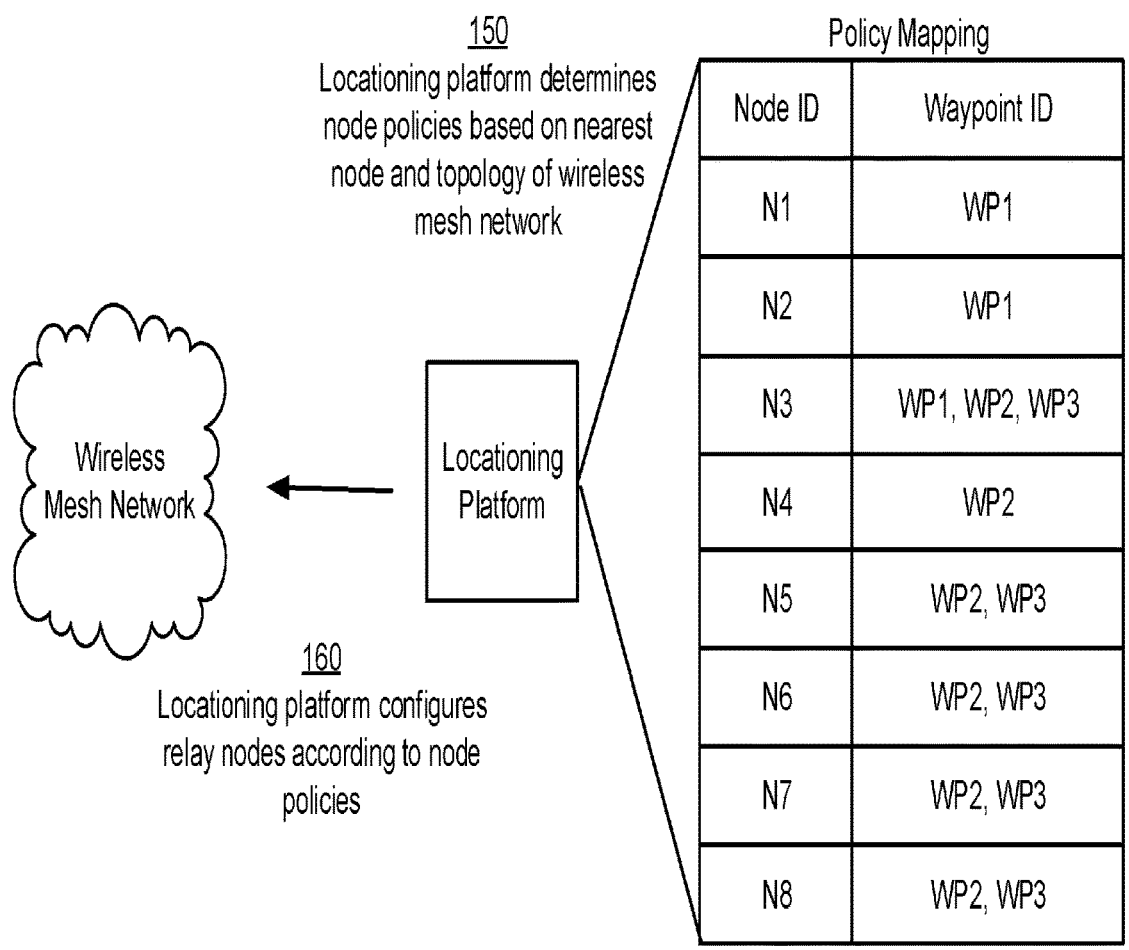

FIGS. 1A-1C are diagrams of an example implementation 100 described herein. As shown in FIGS. 1A-1C, the example implementation 100 includes a plurality of waypoint beacons (shown as "WP1," "WP2," "WP3"), a plurality of assets (which may be referred to herein as "asset beacons" and are shown as "A1" and "A2"), a wireless mesh network comprised of a plurality of relay nodes (shown as "N1" to "N8"), and a locationing platform for performing locationing. As described herein, locationing involves one or more processes that may be performed to identify, determine, and/or provide information that identifies, represents, or may be used to determine a location of an object, such as one or more of the assets of example implementation 100.

As shown in FIG. 1A, and by reference number 110, the waypoint beacons transmit advertisements for locationing of assets. An advertisement may include a beacon identifier ("Beacon ID") of the waypoint beacon and/or location information associated with the waypoint beacon. The beacon identifier may include a name of the beacon (e.g., "WP1"), a media access control (MAC) identifier (MAC ID) or MAC address, a serial number, a make/manufacturer identifier, a model identifier, and/or the like. Other configurations of the advertisement and/or additional data associated with the beacon may be included in the advertisement. For example, the advertisement may be communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being wirelessly transmitted. Furthermore, the advertisement may include a PDU type field, a length field, a gain information field, and/or any other locationing information that may be used for performing locationing as described herein.

The waypoint beacons may be short range wireless communication devices (e.g., BLE transmitters) that are positioned at corresponding waypoints, which may include coordinates and/or identification of a particular location (e.g., that has previously been communicated (or is known) to the asset and/or locationing platform). The asset may be or may include a short range wireless communication device. For example, the asset may be a mobile device used to track a location of an object of interest (e.g., an individual, a product or product inventory, a manufacturing machine, a transportation machine, and/or the like). The asset may send (e.g., via a BLUETOOTH® communication) the locationing information to the locationing platform via the wireless mesh network. For example, A1 may broadcast the locationing information so that a relay node (N1) of the wireless mesh network that is nearest A1 may receive the locationing information.

In this way, the waypoint beacons and/or assets may be configured for locationing using the wireless mesh network.

As further shown in FIG. 1A, and by reference number 120, the relay nodes are configured to form the wireless mesh network for relaying locationing communications of the assets. The relay nodes may be configured to broadcast communications to establish or enable formation of a topology of the wireless mesh network. For example, relay nodes N2, N3, N4, N6, and N7 may all be neighbor nodes of relay node N5 within the topology of the wireless mesh network based on being within wireless communication range of N5.

The relay nodes may correspond to devices and/or components of a particular environment, such as a particular building (e.g., a factory, a warehouse, a retail store, and/or the like), a particular room (e.g., a room with inventory, a room of an assembly line, and/or the like), a campus, and/or the like. As shown, the relay nodes may include and/or be associated with, for example, a smart light bulb (N1, N2, N3, and N6), a smart switch (N4 and N8), and/or a smart fan (N5 and N7). Accordingly, the relay nodes of the wireless mesh network, while enabling locationing communications to be provided from the assets to the locationing platform, may perform one or more other operations associated with a physical environment of the wireless mesh network.

As described herein, the relay nodes may communicate with one another to form and/or configure the wireless mesh network. For example, the relay nodes may be configured to transmit and/or receive (e.g., according to a schedule, based on an event, and/or randomly) advertisements, received locationing communications (e.g., from the assets and/or other relay nodes), control communications associated with operations of devices of the relay nodes (e.g., to emit or not to emit light, to produce air flow or not to produce air flow, to activate or deactivate one or more other devices, and/or the like). In some implementations, when transmitting and/or forwarding an advertisement and/or locationing communication, the relay nodes may forward the advertisement and/or locationing communication via each channel of a designated set of channels (e.g., a set of BLE channels). Similarly, the relay nodes may be configured to cycle through the designated set of channels to listen for advertisements and/or locationing communications from nearby relay nodes and/or assets. Based on exchanging these communications, the relay nodes N1 to N8 may form the wireless mesh network.

According to some implementations, one or more of the relay nodes N1 to N8 may operate as a waypoint beacon, similar to waypoint beacons WP1, WP2, and WP3 described above. Accordingly, a physical location of the one or more relay nodes may be known (e.g., and/or maintained in a waypoint mapping, as described herein), such that advertisements from the one or more relay nodes can be used for locationing. Such a relay node may include a single wireless communication device (e.g., a single BLE device) that operates to form the wireless mesh network and enable locationing to be performed. For example, during operation the relay nodes may periodically (e.g., every 500 milliseconds, every second, and/or the like) transmit an advertisement similar to the waypoint beacons. In this way, the asset and/or relay nodes may determine locations of each other relative to advertisements received and/or associated with the relay nodes. Accordingly, relay nodes may be configured to perform multiple operations to form the wireless communication network and simultaneously enable locationing relative to locations of the relay nodes.

As described herein, the locationing platform may serve as a control hub of the wireless mesh network that is to control a configuration of the relay nodes. For example, the locationing platform may be used to onboard (or add) one of the relay nodes to the wireless mesh network, remove one or more of the relay nodes of wireless mesh network, suspend activity and/or communications associated with one or more of the relay nodes, and/or the like.

In this way, the relay nodes may form the wireless mesh network and/or may be provisioned to enable locationing of assets using the waypoint beacons.

As further shown in FIG. 1A, and by reference number 130, the locationing platform receives locationing communications via the mesh network. As described herein, a locationing communication may include a PDU, a message, a data file, and/or any other type of communication that includes locationing information associated with an asset and a waypoint beacon. The locationing information may include an identifier of a waypoint beacon from an advertisement of the waypoint beacon that was received by the asset, a received signal strength indicator (RSSI) associated with the asset receiving the advertisement, and/or the like. The RSSI may be used to indicate and/or determine a distance between the asset and the waypoint beacon. The locationing information may include other information (e.g., channel information, gain information, and/or the like) that can be used to determine a location of the asset relative to the waypoint beacon.

In some implementations, the locationing communication may originate from and/or be generated by an asset, and correspondingly forwarded by the relay nodes through the wireless mesh network to the locationing platform. In other words, the relay nodes may be configured to, when forwarding a locationing communication, provide the locationing communication as originally received, without editing or processing the locationing communication. In some implementations, a relay node may include a tag and/or identifier (e.g., an address or identifier of the relay node) within the locationing communication that indicates that the relay node received and/or forwarded the locationing communication (e.g., to permit the locationing platform to identify a route path of the locationing communication).

According to some implementations, the locationing communication may have a format that permits the locationing platform to determine a location of one or more of the assets (e.g., relative to one or more of the waypoint beacons). For example, an asset may include the locationing information in a file that can be communicated, via the wireless mesh network, to the locationing platform for locationing. In some implementations, the file may be associated with a data-interchange format (e.g., a JAVASCRIPT® Object Notation (JSON) format).

The locationing platform may be a device (e.g., a user device, a server device, and/or the like) that is configured to perform locationing associated with the waypoint beacons and/or the assets (e.g., to determine a location of the assets relative to the waypoint beacons). As shown, the locationing platform may receive the locationing communications via the relay node N3 (e.g., N3 may serve as a gateway node to the wireless mesh network for the locationing platform).

In this way, the locationing platform may receive locationing communications to permit the locationing platform to perform locationing to determine the location of an asset and/or a distance between the asset and one or more of the waypoint beacons.

As shown in FIG. 1B, and by reference number 140, the locationing platform analyzes the locationing communications to determine nearest relay nodes associated with the locationing communications. The nearest relay nodes may correspond to or be considered as entry nodes of the locationing communications. In FIG. 1B, the locationing communications may include an asset identifier (which identifies A1 and A2), a waypoint identifier ("Waypoint ID"), an entry node, and a received signal strength. The entry node may correspond to the relay node through which the locationing communication entered the wireless mesh network (e.g., the first relay node along the route path through the wireless mesh network to the locationing platform). In some implementations, the entry node is indicated within the locationing communication based on a relay node that received the locationing communication from an entry node including a tag within the locationing communication, to indicate that the relay node is the entry node of the locationing communication and/or that the relay node is along the route path of the locationing communication.

Based on identifying that A1 sent a locationing communication that identified WP1 to N1 (N1 being indicated as the entry node), the locationing platform may determine that N1 is the nearest relay node to WP1. Furthermore, based on identifying that A2 transmitted a locationing communication that identified WP3 to N8 and then a locationing communication that identified WP2 to N6 (e.g., while A2 was moving from a location near WP3 toward WP2, as shown by the dotted arrow), the locationing platform may determine that N8 is nearest WP3 and N6 is nearest WP2. According to some implementations, the locationing platform may monitor a quantity of locationing communications that identify a particular waypoint. In such cases, the locationing platform may designate a relay node as being nearest a particular waypoint beacon based on the relay node being an entry node for a threshold quantity of locationing communications associated with the waypoint beacon. Additionally, or alternatively, when a relay node is capable of operating as a waypoint beacon, the locationing platform may determine the location of a particular relay node relative to other relay nodes operating as waypoint beacons based on the relay node receiving advertisements from the other relay nodes.

Furthermore, from a waypoint mapping that identifies a location of the waypoint beacons (shown as WP1 being at "Loc X," WP2 being at "Loc Y," and WP3 being at "Loc Z") and/or known locations of certain relay nodes (not shown), the locationing platform may map one or more of the relay nodes to the corresponding locations, to determine and/or indicate physical locations of the relay nodes of the wireless mesh network. In some implementations, the locationing platform may determine that an entry node of a locationing platform is a nearest node to the waypoint beacon based on a communication range of the waypoint beacon and/or an RSSI indicated in the locationing information of the locationing communication. For example, if two locationing communications indicate a same waypoint beacon, but different entry nodes to the wireless mesh network, the locationing platform can compare the communication range of the waypoint beacons identified in the two locationing communications and/or the RSSIs of the two locationing communications to determine which entry node is closer to the waypoint beacon. The locationing platform may then map the waypoint beacon to the nearest relay node based on the communication range of the waypoint beacon (e.g., if a communication range of one of the waypoint beacons is known to be shorter than the other) and/or based on the RSSI of an advertisement received from the waypoint beacon (e.g., if an RSSI associated with an advertisement indicates a shorter distance to the waypoint beacon).

In this way, the locationing platform may analyze the locationing communications to determine location information associated with the relay nodes of the wireless mesh network, to permit the locationing platform to configure the relay nodes of the wireless mesh network according to the location information.

As shown in FIG. 1C, and by reference number 150, the locationing platform determines node policies based on the nearest node and topology of the wireless mesh network. In some implementations, the locationing platform may consider a location of the locationing platform relative to the nearest node and the topology of the network to determine the node policies. A node policy for a relay node indicates whether a locationing communication that is associated with a particular waypoint beacon is to be forwarded by that relay node or dropped by that relay node. A locationing communication may be dropped by being erased (e.g., cleared from a memory of the relay node or overwritten in memory by the relay node), not transmitted by the relay node (e.g., during a designated transmission cycle of the relay node), and/or the like.

In some implementations, the locationing platform may receive and/or identify the topology of the wireless mesh network. For example, the locationing platform may receive a topology mapping that indicates neighbor nodes of the relay nodes, and/or correspondingly, a quantity of hops between each pair of relay nodes of the wireless mesh network. As used herein, a hop may correspond to a segment of a route path between two neighbor nodes of the wireless mesh network (e.g., a segment that does not include or go through any other relay node(s) of the wireless mesh network other than the two neighbor nodes). Based on the topology, the locationing platform may identify which relay nodes are along shortest route paths (e.g., route paths that include a least number of hops) between the nearest nodes of the waypoint beacons and the locationing platform. According to some implementations, the locationing platform may be configured to learn the topology of the wireless mesh network based on received locationing communications. For example, during a calibration period, the locationing platform may receive locationing communications to learn the topology of the wireless mesh network without instituting node policies for the relay nodes. The locationing platform may learn the topology based on identifying route paths of the locationing communications according to the relay nodes adding tags to the locationing communications when the relay nodes receive and/or forward the locationing communications. From the tags, the locationing platform can identify the route paths and correspondingly identify neighbor nodes of the relay nodes and/or the topology of the wireless mesh network from the neighbor nodes.

In example implementation 100, the locationing platform may generate and/or maintain a policy mapping for the relay nodes of the wireless mesh network. The policy mapping may specify that the relay nodes are to forward locationing communications associated with the mapped waypoint beacons. If a locationing communication is received that includes locationing information that does not include a waypoint identifier of the corresponding waypoint beacons, the relay node may drop the locationing communication, thereby conserving resources of the wireless mesh network and/or freeing up bandwidth of the wireless mesh network that would otherwise be consumed by transmitting the locationing communication with the waypoint beacon that is not near the corresponding relay nodes or between the relay nodes and the locationing platform.

According to some implementations, the relay nodes may be configured to forward advertisements and/or locationing communications that include an RSSI measurement within a particular range. Additionally, or alternatively, when the relay node (e.g., a bridge of a route path) receives a packet from one or more other relay nodes, the relay node may select to forward the communication associated with a nearest relay according to an RSSI of the communication and/or according to the communication having an RSSI that is within the RSSI range and only forward those communications to the locationing platform. In such a case, the locationing platform may detect a pattern of a particular relay node repeatedly forwarding locationing communications associated with a same relay node (e.g., when that same relay node is operating as a waypoint beacon).

In this way, the locationing platform may determine node policies for the relay nodes according to the nearest nodes of the waypoint beacons and a topology of the wireless mesh network.

As further shown in FIG. 1C, and by reference number 160, the locationing platform configures the relay nodes according to the node policies. For example, the locationing platform may control the relay nodes to forward or drop subsequently received locationing communications associated with one or more of the waypoint beacons according to the policy mapping. The locationing platform may configure the relay nodes based on a schedule, based on a certain event (e.g., a n333ew relay node being activated and/or added to the wireless mesh network, and/or the like), based on a change to the policy mapping (e.g., according to a universally unique identifier (UUID), a MAC ID, an RSSI range, and/or the like), and/or the like.

As a specific example, in example implementation 100, the locationing platform may configure relay nodes that are within one hop of the nearest node of a waypoint beacon to forward locationing communications associated with that waypoint beacon. Accordingly, as shown, the locationing platform may configure N1 and N2 to forward locationing communications associated with WP1 and drop locationing communications associated with WP2 or WP3. The locationing platform may configure N3 to forward locationing communications associated with WP1, WP2, or WP3 (e.g., because N3 is the gateway to locationing platform). The locationing platform may configure N4 to forward locationing communications associated with WP2 and drop locationing communications associated with WP1 or WP3. The locationing platform may configure N5, N6, N7, and N8 to forward locationing communications associated with WP2 or WP3 and drop locationing communications associated with WP1. The policy mapping enables the locationing platform to configure the wireless mesh network to establish optimal routing paths between nearest nodes of WP1, WP2, and WP3. For example, the policy mapping prevents a routing path of a locationing communication of WP1 from going through N1, N2, N4, N5, and N3 because N4 is to drop locationing communications associated with WP1, thus conserving bandwidth of the wireless mesh network that may otherwise be consumed by forwarding the locationing communications to N5 and N6. Furthermore, N4 dropping the locationing communications associated with WP1 conserves computing resources of N5 and N6 that would otherwise be consumed by receiving and/or processing the locationing communications associated with WP1.

In this way, the locationing platform may configure the relay nodes of the wireless mesh network according to node policies, to conserve resources of the relay nodes and/or bandwidth of the wireless mesh network.

As indicated above, FIGS. 1A-1C are provided merely as one or more examples. Other examples may differ from what is described with regard to FIGS. 1A-1C.

Figure 2A:
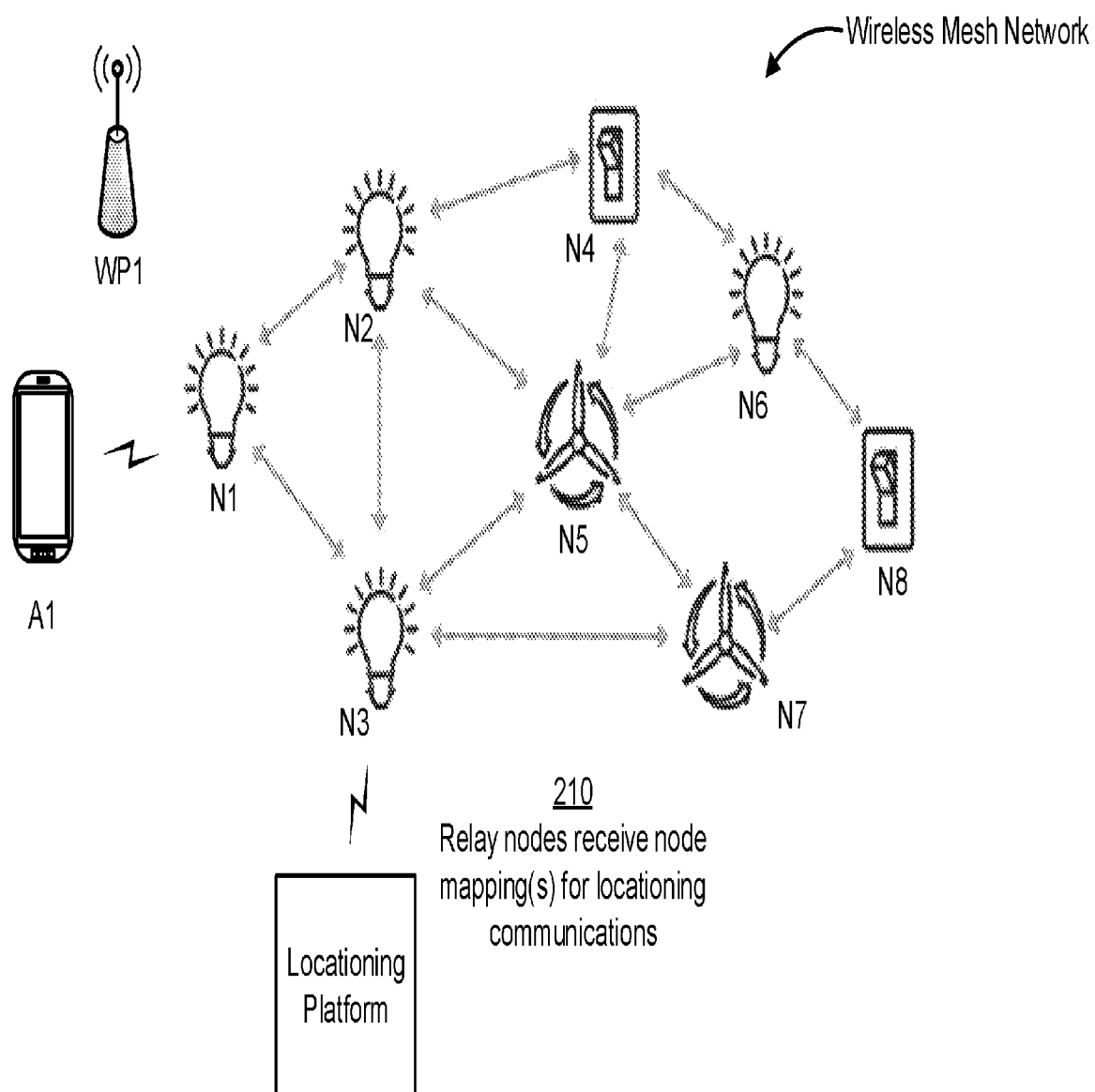
Figure 2B:
Figure 2C:
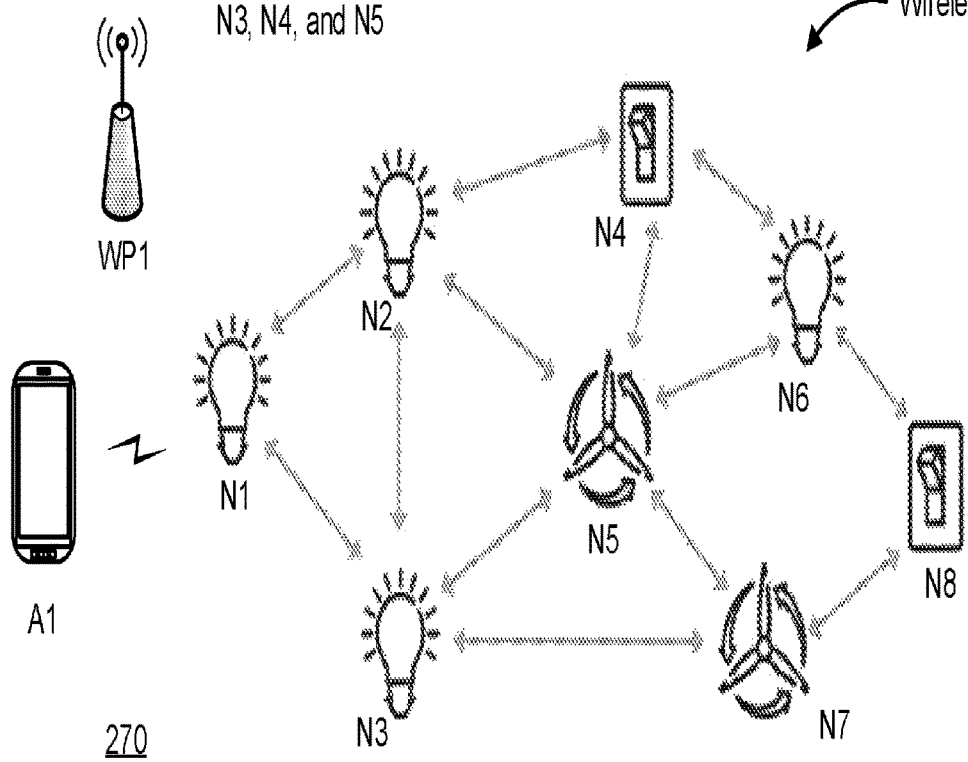

FIGS. 2A-2C are diagrams of an example implementation 200 described herein. As shown in FIGS. 2A-2C, the example implementation 200 includes a waypoint beacon ("WP1"), an asset ("A1"), a wireless mesh network comprised of a plurality of relay nodes (shown as "N1" to "N8"), and a locationing platform for performing locationing.

As shown in FIG. 2A, and by reference number 210, the relay nodes receive mappings for locationing communications. The relay nodes may receive the mappings from the locationing platform. For example, the relay nodes may receive a node mapping that identifies waypoint beacons nearest to the relay nodes of the wireless mesh network. Additionally, or alternatively, the waypoint mapping may include topology information (e.g., neighbor node information, hope information, and/or the like) associated with the wireless mesh network. In some implementations, the relay nodes may receive the mappings based on an update to the mappings (e.g., as determined and/or received by the locationing platform), based on a new relay node being activated and/or added to the wireless mesh network, and/or the like.

In some implementations, the relay nodes may receive a same mapping to permit the relay nodes to determine whether to forward or drop a locationing communication. For example, the mapping may indicate topology information associated with the wireless mesh network and/or node policies associated with the relay nodes of the network. In such a case, the locationing platform may not determine individual policy mappings for each of the relay nodes of the wireless mesh network (e.g., to conserve locationing platform processing resources).

In this way, the relay nodes of the wireless mesh network may receive one or more mappings associated with the wireless mesh network, to permit the relay nodes to route locationing communications as described herein.

As further shown in FIG. 2A, and by reference number 220, N2 receives, from N1, a locationing communication associated with WP1. N2 may receive the locationing communication from N1 based on N1 receiving the locationing communication from A1, which transmitted the locationing communication based on receiving an advertisement from WP1. Accordingly, N1 may correspond to an entry node of the locationing communication. N2 may receive the locationing communication according to a communication protocol of the wireless mesh network. For example, if the wireless mesh network is a BLE mesh network, N2 may receive the locationing communication as a BLE communication.

In this way, N2 may receive the locationing communication from N1, to determine whether to forward or drop the locationing communication.

As shown in FIG. 2B, and by reference number 230, N2 maintains a node mapping to determine a node policy for forwarding and/or dropping the locationing communication. In some implementations, each relay node of the wireless mesh network of example implementation 200 may maintain the node mapping of FIG. 2B to determine a node policy for a locationing communication associated with WP1. N2 may maintain the node mapping in a data structure (e.g., a table, an index, a graph, a database, and/or the like) that is local to N2. The node mapping of FIG. 2B maps identifiers (listed under "Node ID") of the relay nodes to corresponding near waypoints and neighbor nodes ("Topology Information").

In this way, the relay nodes may utilize the node mapping to determine whether to forward the locationing communication through the wireless mesh network or drop the locationing communication.

As further shown in FIG. 2B, and by reference number 240, N2 determines whether to forward the locationing communication using the node mapping and identification of WP1. For example, N2 may process the locationing communication to determine that the locationing communication is associated with WP1. N2 may determine which relay node of the wireless mesh network is near (or nearest) WP1. Accordingly, from the mapping, N2 may determine that WP1 is near N1.

N2 may be configured to forward or drop the locationing communication based on a distance from the nearest node (N1) to N2. The distance may include a physical distance, or a quantity of hops of the wireless mesh network between the nearest node and N2. In example implementation 200, N2 may determine the quantity of hops between N1 and N2 based on the topology information. From the topology information, N2 may determine that N2 is one hop from the nearest node N1.

In some implementations, N2 may be configured with location information associated with N2 (e.g., geographical coordinates, location specific coordinates, and/or the like) and/or waypoint beacons of the wireless mesh network, including WP1. Accordingly, N2 may determine, from the location information, a physical distance between N1 and N2 to determine whether to forward or drop the locationing communication. For example, if the distance is less than a threshold distance (e.g., a distance that is based on a communication range of the waypoint beacon and/or the relay nodes), N2 may forward the locationing communication (e.g., because N2 is relatively close to the entry node), and, if the distance is greater than the threshold distance, N2 may drop the locationing communication (e.g., because N2 is relatively far from the entry node).

As shown in FIG. 2C, and by reference number 250, based on the determined distance between N1 and N2, N2 forwards the locationing communication to N3, N4, and N5. For example, based on N1 and N2 being less than a threshold distance apart or being equal to or less than a threshold quantity of hops, N2 then forwards the locationing communication to the neighbor nodes of N2, which are N3, N4, and N5.

As further shown in FIG. 2C, and by reference number 260, based on the determined distances from WP1 and/or N1, N4 and N5 drop the locationing communication. For example, because N4 and N5 are determined to be greater than the threshold distance and/or a threshold quantity of hops from the nearest node of WP1 (as determined from the topology information), N4 and N5 may drop the locationing communication, to conserve bandwidth of the wireless mesh network and/or processing resources of other relay nodes (N6, N7, N3) of the wireless mesh network.

As further shown in FIG. 2C, and by reference number 270, based on the determined distance(s) from the nearest node to WP1 and/or N1, N3 forwards the locationing communication to the locationing platform.

In this way, the relay nodes of the wireless mesh network are configured to optimally relay a locationing communication through a wireless mesh network according to a node mapping and/or determined topology of the wireless mesh network.

As indicated above, FIGS. 2A-2C are provided merely as one or more examples. Other examples may differ from what is described with regard to FIGS. 2A-2C.

Figure 3:
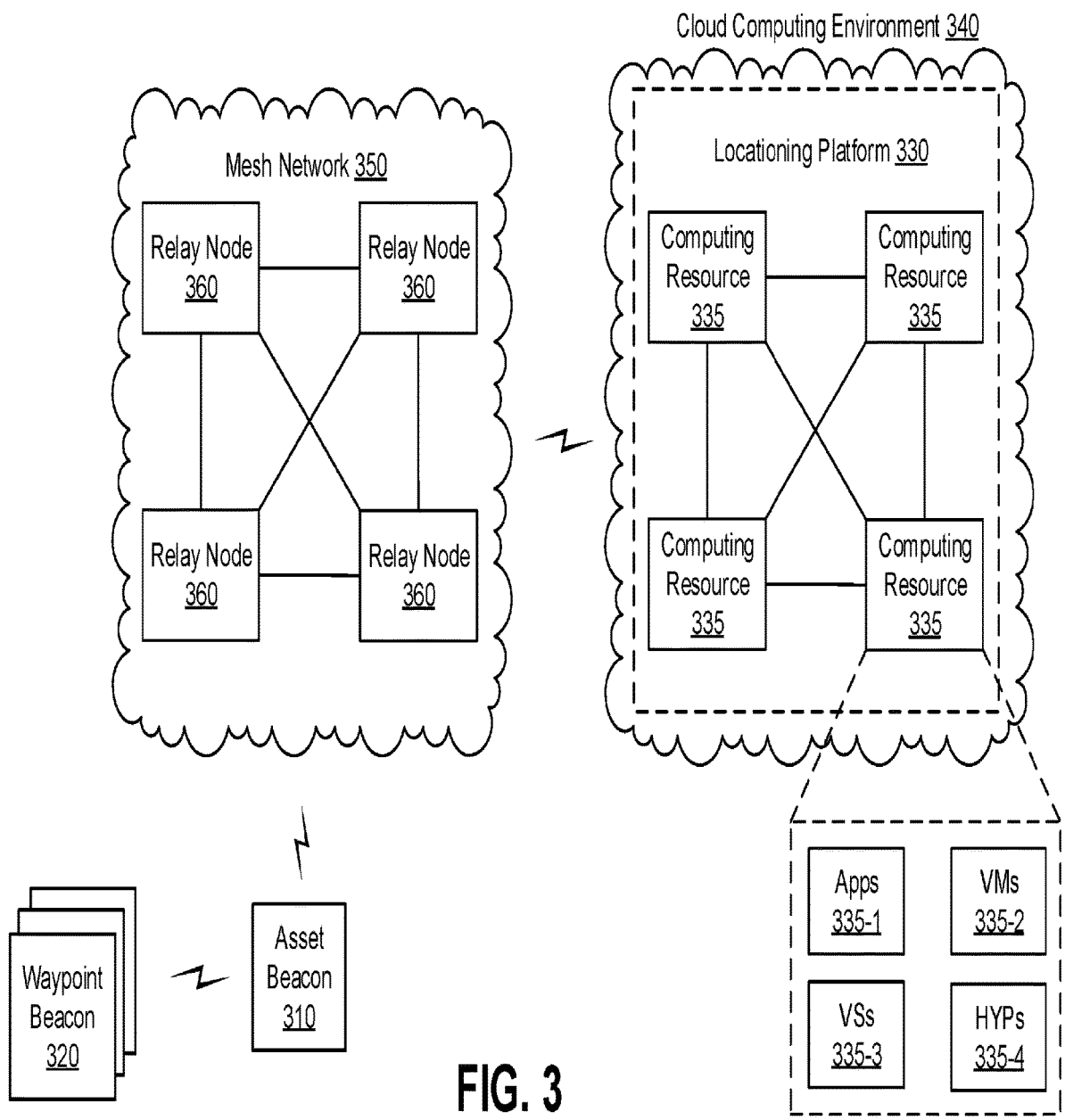
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an asset beacon 310, one or more waypoint beacons 320 (referred to herein individually as "waypoint beacon 320", and collectively as "waypoint beacons 320"), a locationing platform 330 hosted by computing resources 335 of a cloud computing environment 340, and a mesh network that includes a plurality of relay nodes 360 (referred to herein individually as "relay node 360", and collectively as "relay nodes 360"). Devices of environment 300 may interconnect via wired connections, wireless connections, or a combination of wired and wireless connections.

The asset beacon 310 includes one or more devices capable of receiving, generating, storing, processing, and/or providing information associated with performing locationing of the asset beacon 310. For example, the asset beacon 310 may include a mobile communication device and/or mobile computing device, such as a mobile phone (e.g., a smartphone, a radiotelephone, and/or the like), a laptop computer, a tablet computer, a handheld computer, a scanner device (e.g., a barcode scanner), a wearable communication device (e.g., a smart wristwatch, a pair of smart eyeglasses, and/or the like), a tracking device, a locator beacon, a diagnostic device, an industry specific computing device, a vehicle (e.g., including an operator controlled vehicle, an autonomous vehicle, or semiautonomous vehicle), or a similar type of device. The asset beacon 310, as described herein, may correspond to the assets of example implementation 100 and/or may be designated as being associated with an object of interest (e.g., an object that is to be monitored by locationing platform 330).

The waypoint beacon 320 includes one or more devices or components capable of generating, storing, processing, and/or providing locationing information associated with performing locationing of the asset beacon 310 relative to the waypoint beacon 320. For example, the waypoint beacon 320 may be configured to include, within advertisements transmitted from the waypoint beacon 320, information identifying a waypoint identifier of waypoint beacon 320, location information associated with waypoint beacon 320, and/or the like. One or more of the waypoint beacons 320 may correspond to the waypoint beacons of example implementation 100. The location information may include an address and/or coordinates (e.g., geographical coordinates, location specific coordinates, and/or the like), waypoint information associated with the location (e.g., a building identifier, a room identifier, an aisle identifier, a shelf identifier, and/or the like), and/or the like.

The locationing platform 330 includes one or more of the computing resources 335 assigned to configure the mesh network 350 for locationing of the asset beacon 310 using the waypoint beacons 320. For example, the locationing platform 330 may be a platform implemented by the cloud computing environment 340 that may receive a locationing communication associated with a waypoint beacon 320, determine (e.g., based on a known location of the waypoint beacon 320) a node location of a relay node 360 through which the locationing communication entered the mesh network 350, and configure the relay node (and/or one or more other relay nodes 360) based on the node location. In some implementations, the locationing platform 330 is implemented by the computing resources 335 of the cloud computing environment 340. In some implementations, the locationing platform 330 is designated to perform locationing associated with the asset beacon 310 and the waypoint beacons 320 using the relay nodes 360 of the mesh network 350.

The locationing platform 330 may include a server device or a group of server devices. In some implementations, the locationing platform 330 may be hosted in the cloud computing environment 340. Notably, while implementations described herein may describe the locationing platform 330 as being hosted in the cloud computing environment 340, in some implementations, the locationing platform 330 may be non-cloud-based or may be partially cloud-based.

The cloud computing environment 340 includes an environment that delivers computing as a service, whereby shared resources, services, and/or the like may be provided to the asset beacon 310, the waypoint beacons 320, the relay nodes 360, and/or the like. The cloud computing environment 340 may provide computation, software, data access, storage, and/or other services that do not require end-user knowledge of a physical location and configuration of a system and/or a device that delivers the services. As shown, the cloud computing environment 340 may include the locationing platform 330 and the computing resources 335.

The computing resource 335 includes one or more personal computers, workstation computers, server devices, or another type of computation and/or communication device. In some implementations, the computing resource 335 may host the locationing platform 330. The cloud resources may include compute instances executing in the computing resource 335, storage devices provided in the computing resource 335, data transfer devices provided by the computing resource 335, and/or the like. In some implementations, the computing resource 335 may communicate with other computing resources 335 via wired connections, wireless connections, or a combination of wired and wireless connections.

As further shown in FIG. 3, the computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

The application 335-1 includes one or more software applications that may be provided to or accessed by the asset beacon 310, the waypoint beacons 320, and/or the relay nodes 360. The application 335-1 may eliminate a need to install and execute the software applications on the asset beacon 310, the waypoint beacons 320, and/or the relay nodes 360. For example, the application 335-1 may include software associated with the locationing platform 330 and/or any other software capable of being provided via the cloud computing environment 340. In some implementations, one application 335-1 may send/receive information to/from one or more other applications 335-1, via the virtual machine 335-2.

The virtual machine 335-2 includes a software implementation of a machine (e.g., a computer) that executes programs like a physical machine. The virtual machine 335-2 may be either a system virtual machine or a process virtual machine, depending upon use and degree of correspondence to any real machine by the virtual machine 335-2. A system virtual machine may provide a complete system platform that supports execution of a complete operating system ("OS"). A process virtual machine may execute a single program and may support a single process. In some implementations, the virtual machine 335-2 may execute on behalf of asset beacon 310, and may manage infrastructure of the cloud computing environment 340, such as data management, synchronization, or long-duration data transfers.

The virtualized storage 335-3 includes one or more storage systems and/or one or more devices that use virtualization techniques within the storage systems or devices of the computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. According to some implementations, the virtualized storage 335-3 may include or be associated with a distributed ledger, a blockchain, and/or the like.

The hypervisor 335-4 provides hardware virtualization techniques that allow multiple operating systems (e.g., "guest operating systems") to execute concurrently on a host computer, such as the computing resource 335. The hypervisor 335-4 may present a virtual operating platform to the guest operating systems and may manage the execution of the guest operating systems. Multiple instances of a variety of operating systems may share virtualized hardware resources.

The mesh network 350 includes one or more wired and/or wireless networks. For example, the mesh network 350 may include a local area network (LAN), a wide area network (WAN), a metropolitan area network (MAN), a private network, an ad hoc network, an intranet, short range wireless communication network, and/or the like, and/or a combination of these or other types of networks.

The relay node 360 includes one or more devices (e.g., one or more traffic transfer devices) capable of processing and/or transferring traffic through the mesh network 350 (e.g., between the asset beacon 310 and the locationing platform 330). For example, the relay node 360 may include a short range wireless communication device (e.g., BLE device) that is capable of serving as a router, a gateway, a network switch, a hub, a bridge, or a similar device. In some implementations, the relay node 360 may perform one or more operations similar to the waypoint beacon 320 (e.g., to enable locationing according to a known location of the relay node 360).

In some implementations, the relay node 360 may include a node mapping that includes information (e.g., location information, topology information, and/or the like) associated with the waypoint beacons 320 and/or the mesh network 350 for communicating locationing information associated with asset beacon 310. Accordingly, as described herein, the relay node 360 may be configured to receive a locationing communication associated with the asset beacon 310 that identifies one of the waypoint beacons 320 and determine, using the node mapping, a distance between a waypoint location associated with the waypoint beacon and a relay node location of the relay node 360. Furthermore, based on the distance, the relay node 360 may drop the locationing information (e.g., so as not to consume bandwidth of other relay nodes 360 of the mesh network 350) or forward the locationing communication through the mesh network to enable locationing in association with the waypoint location.

In some implementations, a relay node 360 may be (and/or may be associated with) one or more types of smart devices that are capable of being controlled via communications of the mesh network 350. For example, the relay node 360 may be a smart light bulb that can be wirelessly controlled to emit light via the mesh network 350, a smart fan that can be wirelessly controlled to circulate air or provide air flow, or a smart sensor that can wirelessly monitor a physical condition (e.g., a temperature, a humidity, motion, and/or the like) associated with environment 300. Additionally, or alternatively, the relay node 360 may include a smart switch that can wirelessly communicate with one or more other relay nodes to activate or deactivate an operation associated with the one or more other relay nodes.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
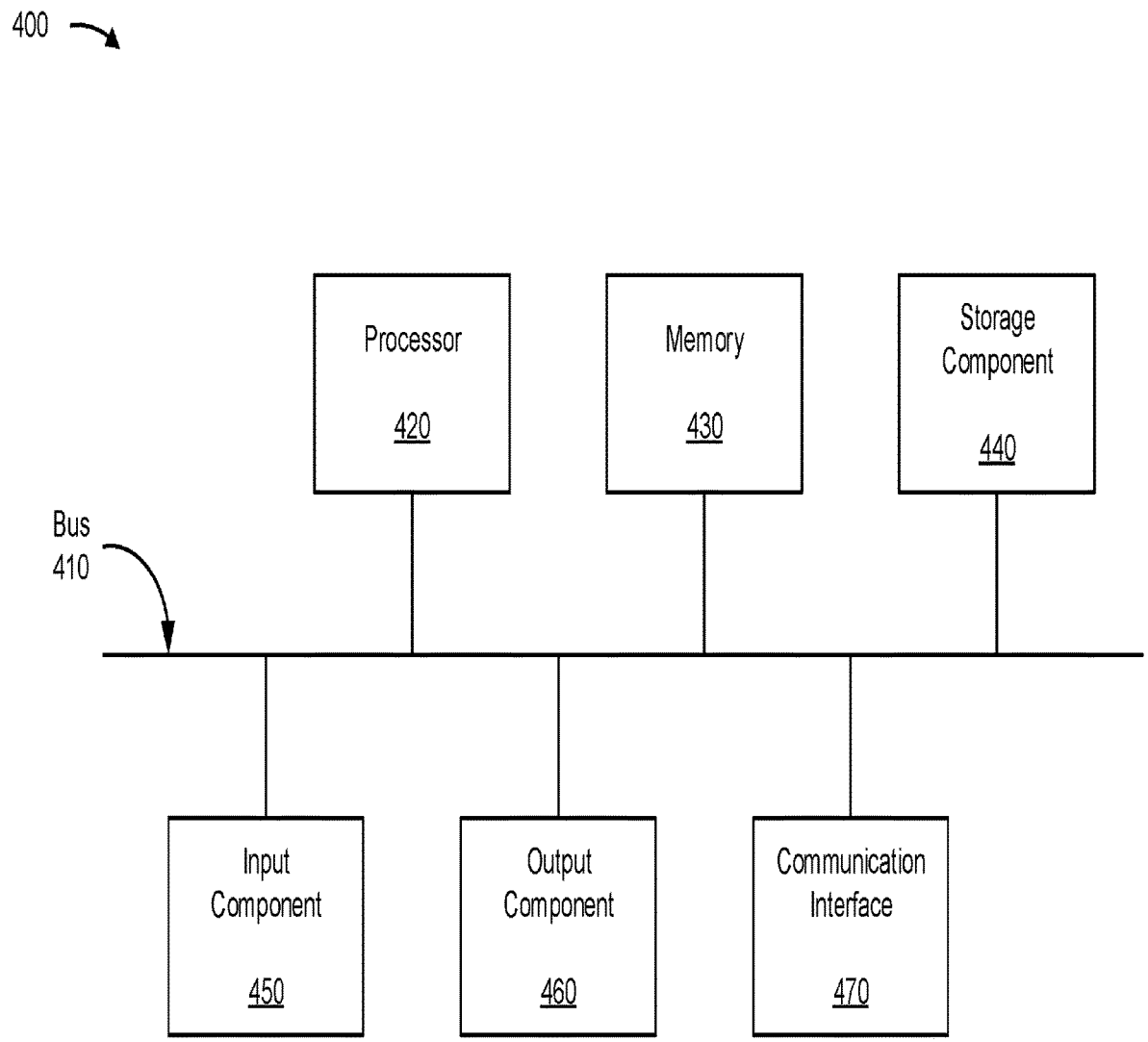
FIG. 4 is a diagram of example components of one or more devices of FIG. 3.

FIG. 4 is a diagram of example components of a device 400. Device 400 may correspond to asset beacon 310, waypoint beacon 320, locationing platform 330, computing resource 335, and/or relay node 360. In some implementations, asset beacon 310, waypoint beacon 320, locationing platform 330, computing resource 335, and/or relay node 360 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory machine-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory machine-readable medium, such as memory 430 and/or storage component 440. As used herein, the term "machine-readable medium" refers to a non-transitory memory device. A memory device includes memory space within a single physical storage device or memory space spread across multiple physical storage devices.

Software instructions may be read into memory 430 and/or storage component 440 from another machine-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
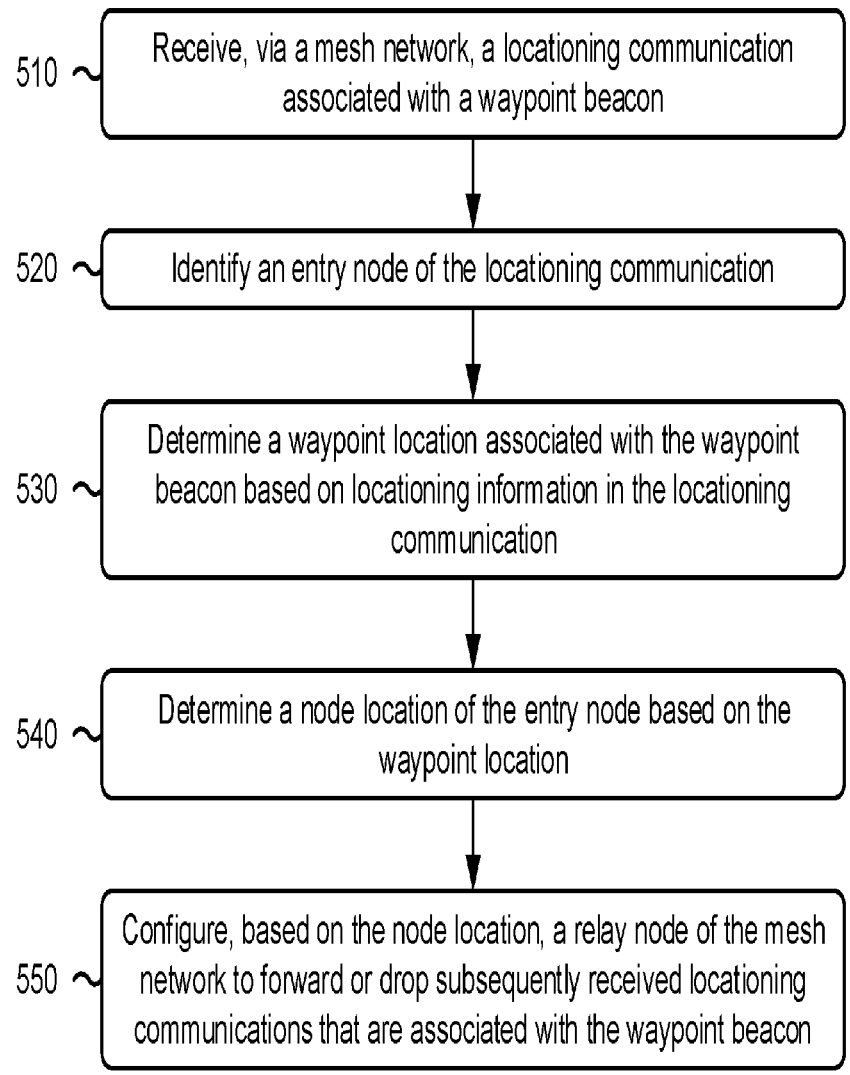
FIGS. 5-7 are flowcharts of example processes for configuring a wireless mesh network for locationing.

FIG. 5 is a flowchart of an example process 500 for configuring a wireless mesh network for locationing. In some implementations, one or more process blocks of FIG. 5 may be performed by a locationing platform (e.g., the locationing platform 330). In some implementations, one or more process blocks of FIG. 5 may be performed by another device or a group of devices separate from or including the locationing platform, such as an asset beacon (e.g., the asset beacon 310), a waypoint beacon (e.g., the waypoint beacon 320), a relay node (e.g., the relay node 360), and/or the like.

As shown in FIG. 5, process 500 may include receiving, via a mesh network, a locationing communication associated with a waypoint beacon (block 510). For example, the locationing platform (e.g., using processor 420, memory 430, storage component 440, input component 450, output component 460, communication interface 470 and/or the like) may receive, via a mesh network, a locationing communication associated with a waypoint beacon, as described above.

As further shown in FIG. 5, process 500 may include identifying an entry node of the locationing communication (block 520). For example, the locationing platform (e.g., using processor 420, memory 430, storage component 440, input component 450, output component 460, communication interface 470 and/or the like) may identify an entry node of the locationing communication, as described above.

As further shown in FIG. 5, process 500 may include determining a waypoint location associated with the waypoint beacon based on locationing information in the locationing communication (block 530). For example, the locationing platform (e.g., using processor 420, memory 430, storage component 440, input component 450, output component 460, communication interface 470 and/or the like) may determine a waypoint location associated with the waypoint beacon based on locationing information in the locationing communication, as described above.

In some implementations, determining the waypoint location includes identifying a waypoint identifier in the locationing information, and determining, based on the waypoint identifier, the waypoint location using a waypoint mapping, and the waypoint mapping identifies respective locations of the waypoint beacon and one or more other waypoint beacons in an area of the mesh network.

As further shown in FIG. 5, process 500 may include determining a node location of the entry node based on the waypoint location (block 540). For example, the locationing platform (e.g., using processor 420, memory 430, storage component 440, input component 450, output component 460, communication interface 470 and/or the like) may determine a node location of the entry node based on the waypoint location, as described above.

In some implementations, process 500 may include determining that the node location is within an area of the waypoint location based on at least one of: a communication range of the waypoint beacon, or a received signal strength indicator associated with the entry node receiving the locationing information, and the received signal strength indicator is included in the locationing communication.

As further shown in FIG. 5, process 500 may include configuring, based on the node location, a relay node of the mesh network to forward or drop subsequently received locationing communications that are associated with the waypoint beacon (block 550). For example, the locationing platform (e.g., using processor 420, memory 430, storage component 440, input component 450, output component 460, communication interface 470 and/or the like) may configure, based on the node location, a relay node of the mesh network to forward or drop subsequently received locationing communications that are associated with the waypoint beacon, as described above.

In some implementations, the entry node corresponds to a node of the mesh network that received the locationing information from a wireless communication device, and process 500 may include performing a locationing process associated with the wireless communication device based on the locationing information.

In some implementations, configuring the relay node includes updating a policy of the relay node to include the locationing information and correspondingly indicate, in association with the identifier, whether the relay node is to forward or drop the subsequently received locationing communications.

In some implementations, process 500 may include determining, based on the node location, a quantity of hops of the mesh network between the relay node and the entry node. Further, configuring the relay node to forward the subsequently received locationing communications may include forwarding the subsequently received locationing communications based on the quantity of hops being less than or equal to a threshold quantity of hops of the mesh network from the entry node, and configuring the relay node to drop the subsequently received locationing communications may include dropping the subsequently received locationing communications based on the quantity of hops being greater than the threshold quantity of hops of the mesh network from the entry node.

In some implementations, the relay node is configured to forward the subsequently received locationing communications when the relay node is determined to be less than a threshold route length from the node location, and the relay node is configured to drop the subsequently received locationing communications when the relay node is determined to be greater than the threshold route length from the node location.

In some implementations, one or more of the subsequently received locationing communications are associated with the waypoint beacon based on the waypoint beacon being identified in the subsequently received locationing communications.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
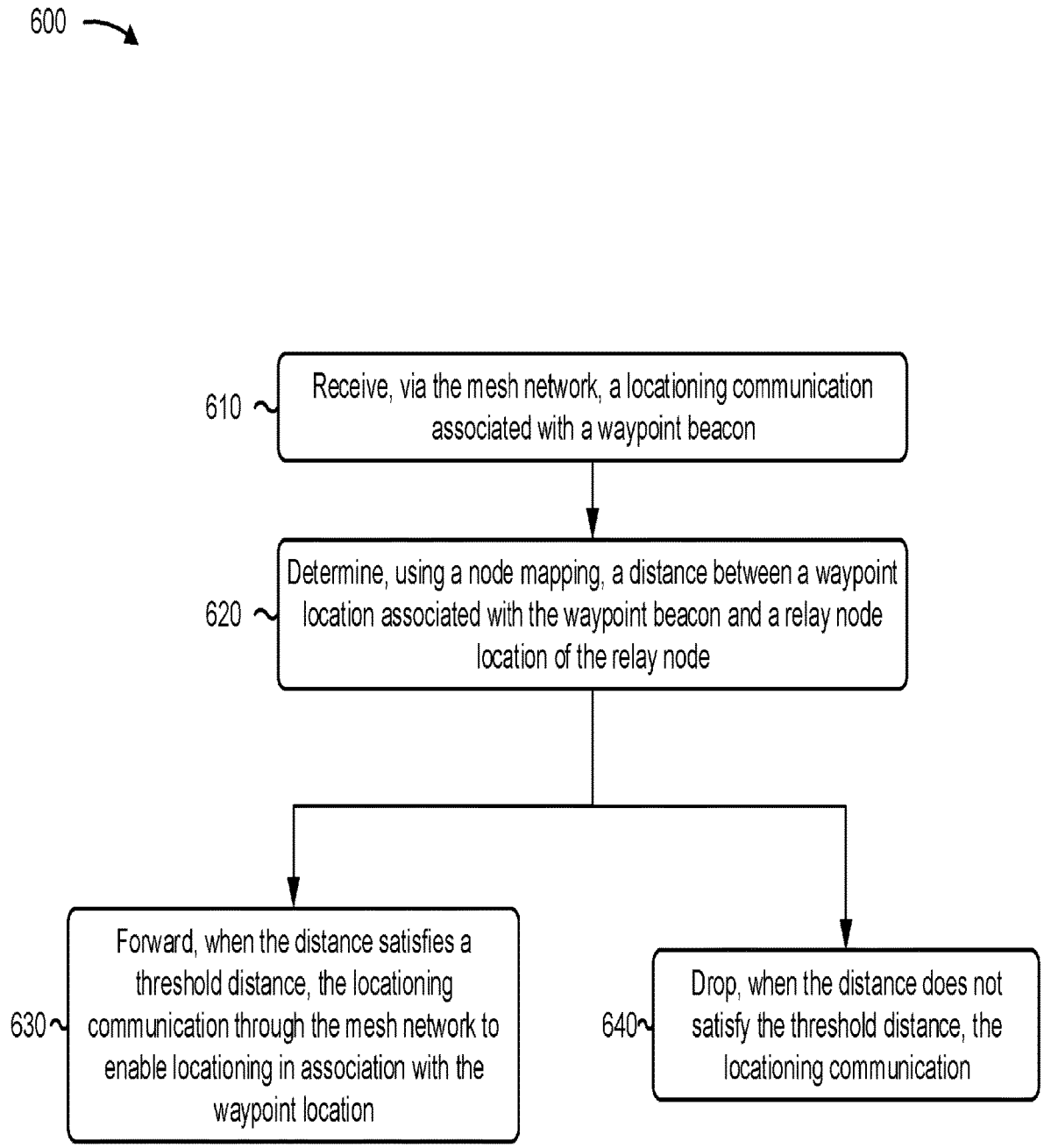

FIG. 6 is a flowchart of an example process 600 for configuring a wireless mesh network for locationing. In some implementations, one or more process blocks of FIG. 6 may be performed by a relay node (e.g., the relay node 360). In some implementations, one or more process blocks of FIG. 6 may be performed by another device or a group of devices separate from or including the relay node, such as an asset beacon (e.g., the asset beacon 310), a waypoint beacon (e.g., the waypoint beacon 320), a locationing platform (e.g., the locationing platform 330), and/or the like.

As shown in FIG. 6, process 600 may include receiving, via the mesh network, a locationing communication associated with a waypoint beacon (block 610). For example, the relay node (e.g., using processor 420, memory 430, storage component 440, input component 450, output component 460, communication interface 470 and/or the like) may receive, via the mesh network, a locationing communication associated with a waypoint beacon, as described above.

In some implementations, the relay node may identify, from the locationing communication, a waypoint identifier of the waypoint beacon, determine the waypoint location based on the waypoint identifier and a first entry of the node mapping, and determine the relay node location based on a node identifier of the relay node and a second entry of the node mapping.

As further shown in FIG. 6, process 600 may include determining, using a node mapping, a distance between a waypoint location associated with the waypoint beacon and a relay node location of the relay node (block 620). For example, the relay node (e.g., using processor 420, memory 430, storage component 440, input component 450, output component 460, communication interface 470 and/or the like) may determine, using a node mapping, a distance between a waypoint location associated with the waypoint beacon and a relay node location of the relay node, as described above.

In some implementations, the node mapping includes at least one of: mappings of a plurality of waypoint beacons, associated with the mesh network, with corresponding nearest nodes of the mesh network; mappings of node locations of a plurality of nodes of the mesh network, where the relay node is one of the plurality of nodes of the mesh network; or mappings of topology information of the plurality of nodes of the mesh network.

In some implementations, the distance corresponds to a quantity of hops of the mesh network between the relay node and an entry node of the mesh network that provided the locationing communication, the waypoint location corresponds to an entry node location of the entry node within the mesh network, and the threshold distance corresponds to a threshold quantity of hops.

In some implementations, the relay node may identify, from the locationing communication, a waypoint identifier of the waypoint beacon; identify, based on the waypoint identifier and the node mapping, the entry node to determine the entry node location within a topology of the mesh network; identify, from the node mapping, the relay node location within the topology of the mesh network; determine, from topology information of the mesh network in the node mapping, the topology of the mesh network; and determine, based on the topology of the mesh network, the quantity of hops between the entry node location and the relay node location, to determine the distance.

As further shown in FIG. 6, process 600 may include forwarding, when the distance satisfies the threshold distance, the locationing communication through the mesh network to enable locationing in association with the waypoint location (block 630). For example, the relay node (e.g., using processor 420, memory 430, storage component 440, input component 450, output component 460, communication interface 470 and/or the like) may forward, when the distance satisfies the threshold distance, the locationing communication through the mesh network, to enable locationing in association with the waypoint location, as described above.

As further shown in FIG. 6, process 600 may include dropping, when the distance does not satisfy the threshold distance, the locationing communication (block 640). For example, the relay node (e.g., using processor 420, memory 430, storage component 440, input component 450, output component 460, communication interface 470 and/or the like) may drop, when the distance does not satisfy the threshold distance, the locationing communication, as described above.

In some implementations, the relay node is a BLUETOOTH® low energy device and the mesh network is a BLUETOOTH® low energy mesh network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
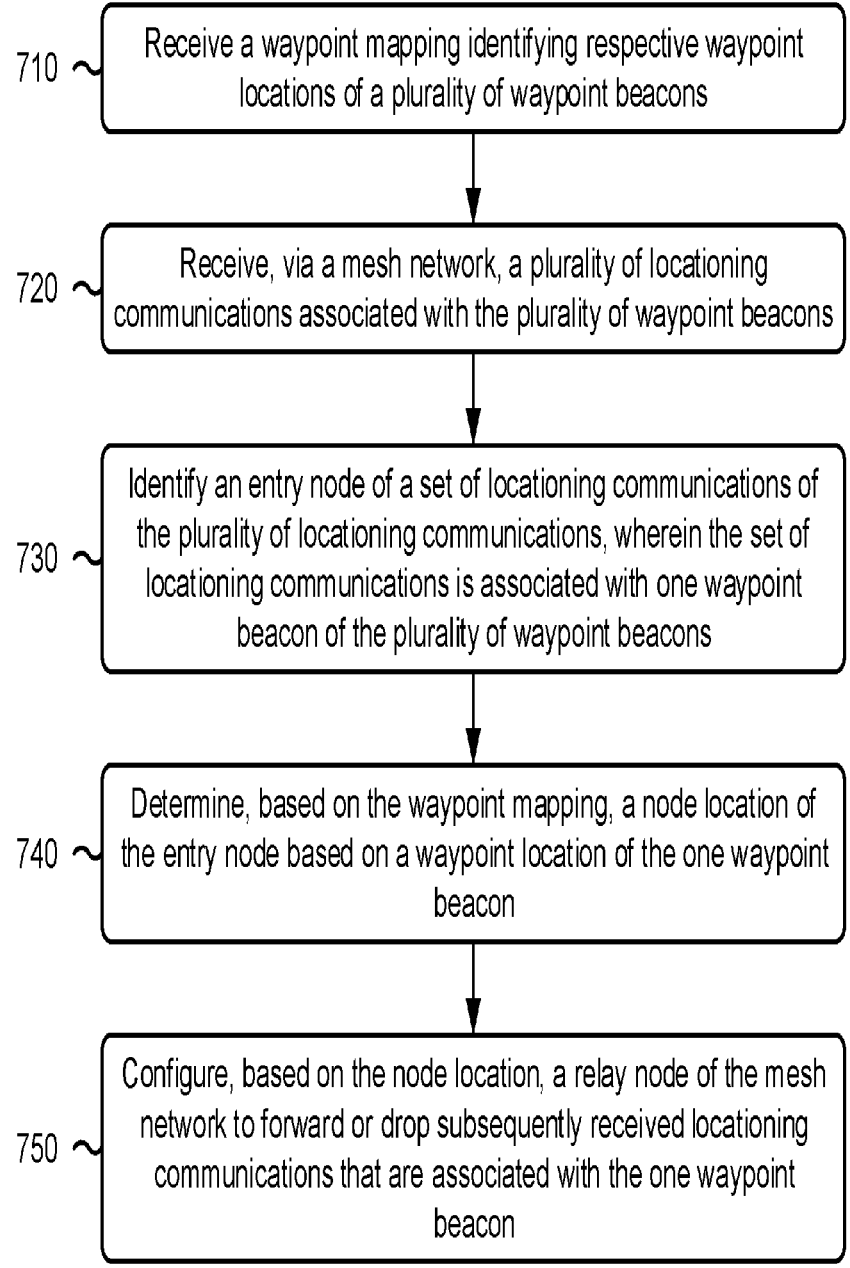

FIG. 7 is a flow chart of an example process 700 for configuring a wireless mesh network for locationing. In some implementations, one or more process blocks of FIG. 7 may be performed by a locationing platform (e.g., the locationing platform 330). In some implementations, one or more process blocks of FIG. 7 may be performed by another device or a group of devices separate from or including the locationing platform, such as an asset beacon (e.g., the asset beacon 310), a waypoint beacon (e.g., the waypoint beacon 320), a relay node (e.g., the relay node 360), and/or the like.

As shown in FIG. 7, process 700 may include receiving a waypoint mapping identifying respective waypoint locations of a plurality of waypoint beacons (block 710). For example, the locationing platform (e.g., using processor 420, memory 430, storage component 440, input component 450, output component 460, communication interface 470 and/or the like) may receive a waypoint mapping identifying respective waypoint locations of a plurality of waypoint beacons, as described above.

As further shown in FIG. 7, process 700 may include receiving, via a mesh network, a plurality of locationing communications associated with the plurality of waypoint beacons (block 720). For example, the locationing platform (e.g., using processor 420, memory 430, storage component 440, input component 450, output component 460, communication interface 470 and/or the like) may receive, via a mesh network, a plurality of locationing communications associated with the plurality of waypoint beacons, as described above.

As further shown in FIG. 7, process 700 may include identifying an entry node of a set of locationing communications of the plurality of locationing communications, wherein the set of locationing communications is associated with one waypoint beacon of the plurality of waypoint beacons (block 730). For example, the locationing platform (e.g., using processor 420, memory 430, storage component 440, input component 450, output component 460, communication interface 470 and/or the like) may identify an entry node of a set of locationing communications of the plurality of locationing communications, as described above. In some implementations, the set of locationing communications is associated with one waypoint beacon of the plurality of waypoint beacons.

In some implementations, the entry node corresponds to a node of the mesh network through which locationing information of the locationing communication entered the mesh network, and the locationing information identifies the one waypoint beacon for locationing.

As further shown in FIG. 7, process 700 may include determining, based on the waypoint mapping, a node location of the entry node based on a waypoint location of the one waypoint beacon (block 740). For example, the locationing platform (e.g., using processor 420, memory 430, storage component 440, input component 450, output component 460, communication interface 470 and/or the like) may determine, based on the waypoint mapping, a node location of the entry node based on a waypoint location of the one waypoint beacon, as described above.

In some implementations, determining the node location includes determining that the set of the locationing communications includes a threshold quantity of locationing communications associated with the one waypoint beacon, and determining the node location based on the set of the locationing communications including the threshold quantity of locationing communications associated with the one waypoint beacon.

As further shown in FIG. 7, process 700 may include configuring, based on the node location, a relay node of the mesh network to forward or drop subsequently received locationing communications that are associated with the one waypoint beacon (block 750). For example, the locationing platform (e.g., using processor 420, memory 430, storage component 440, input component 450, output component 460, communication interface 470 and/or the like) may configure, based on the node location, a relay node of the mesh network to forward or drop subsequently received locationing communications that are associated with the one waypoint beacon, as described above.

In some implementations, the set of locationing communications is a first set of locationing communications, and process 700 includes determining that a second set of locationing communications of the plurality of locationing communications entered the mesh network via the relay node, wherein the second set of locationing communications is associated with the one waypoint beacon, and determining, based on the first set of locationing communications and the second set of locationing communications being associated with the one waypoint beacon, that the relay node and the entry node are within a threshold quantity of hops of the mesh network.

In some implementations, process 700 includes configuring the relay node to forward subsequently received locationing communications that are associated with the one waypoint beacon based on the relay node and the entry node being determined to be within the threshold quantity of hops of the mesh network.

In some implementations, process 700 includes configuring the relay node to forward the subsequently received locationing communications when the relay node is determined to be less than or equal a threshold quantity of hops of the mesh network from the entry node, or configuring the relay node to drop the subsequently received locationing communications when the relay node is determined to be greater than the threshold quantity of hops of the mesh network from the entry node.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a location platform, a waypoint mapping identifying respective locations of a waypoint beacon and one or more other waypoint beacons in an area of a mesh network and a topology of the mesh network;
   receiving, by the locationing platform and via the mesh network, a locationing communication associated with the waypoint beacon;
   identifying, by the locationing platform, an entry node of the locationing communication;
   determining, by the locationing platform, a waypoint location associated with the waypoint beacon based on locationing information in the locationing communication;
   determining, by the locationing platform and based on the waypoint mapping, a node location of the entry node based on the waypoint location associated with the waypoint beacon;
   determining, by the locationing platform, a node policy based on the node location and the topology of the mesh network; and
   configuring, by the locationing platform and based on the node policy, a relay node of the mesh network to forward or drop subsequently received locationing communications that are associated with the waypoint beacon,
   wherein the entry node corresponds to a node of the mesh network through which the locationing information entered the mesh network from a wireless communication device.

2. The method of claim 1, wherein determining the waypoint location comprises:
   identifying a waypoint identifier in the locationing information; and
   determining, based on the waypoint identifier, the waypoint location using the waypoint mapping.

3. The method of claim 1, further comprising:
   determining that the node location is within an area of the waypoint location based on at least one of:
     a communication range of the waypoint beacon, or
     a received signal strength indicator associated with the entry node receiving the locationing information,
     wherein the received signal strength indicator is included in the locationing communication.

4. The method of claim 1, wherein the method further comprises performing a locationing process associated with the wireless communication device based on the locationing information.

5. The method of claim 1, wherein configuring the relay node comprises:
   updating a policy of the relay node to:
     include the locationing information, and
     correspondingly indicate, in association with the identifier, whether the relay node is to forward or drop the subsequently received locationing communications.

6. The method of claim 1, further comprising:
   determining, based on the node location, a quantity of hops of the mesh network between the relay node and the entry node,
   wherein configuring the relay node to forward the subsequently received locationing communications comprises:
     forwarding the subsequently received locationing communications based on the quantity of hops being less than or equal to a threshold quantity of hops of the mesh network from the entry node, and
   wherein configuring the relay node to drop the subsequently received locationing communications comprises:
     dropping the subsequently received locationing communications based on the quantity of hops being greater than the threshold quantity of hops of the mesh network from the entry node.

7. The method of claim 1,
   wherein the relay node is configured to forward the subsequently received locationing communications when the relay node is determined to be less than a threshold route length from the node location, and
   wherein the relay node is configured to drop the subsequently received locationing communications when the relay node is determined to be greater than the threshold route length from the node location.

8. The method of claim 1, wherein one or more of the subsequently received locationing communications are associated with the waypoint beacon based on the waypoint beacon being identified in the subsequently received locationing communications.

* * * * *